United States Patent [19]
Sonobe et al.

[11] Patent Number: 5,587,255
[45] Date of Patent: Dec. 24, 1996

[54] CARBONACEOUS ELECTRODE MATERIAL FOR SECONDARY BATTERY

[75] Inventors: Naohiro Sonobe; Koji Maruyama; Takao Iwasaki, all of Iwaki, Japan

[73] Assignee: Kureha Kagaku Kogyo Kabushiki Kaisha, Tokyo, Japan

[21] Appl. No.: 199,810

[22] Filed: Feb. 22, 1994

[30] Foreign Application Priority Data

Feb. 25, 1993 [JP] Japan ..................................... 5-059427
Nov. 26, 1993 [JP] Japan ..................................... 5-319288

[51] Int. Cl.$^6$ ................................................... H01M 4/02
[52] U.S. Cl. ....................... 429/218; 429/194; 423/445 R
[58] Field of Search ..................................... 429/218, 194; 423/445

[56] References Cited

U.S. PATENT DOCUMENTS 4,702,977  10/1987  Hiratsuka et al. ........................ 429/194
4,959,281  9/1990   Nishi et al. ............................... 429/194
5,176,969  6/1993   Miyabayashi et al. ................... 429/212

FOREIGN PATENT DOCUMENTS 0201038  11/1986  European Pat. Off. .
0495613  7/1992   European Pat. Off. .
0527054  2/1993   European Pat. Off. .
0573266  12/1993  European Pat. Off. .

OTHER PUBLICATIONS

Abstract of JP-4319265, Masayuki et al., "Non-aqueous Electrolyte Secondary Battery", Oct. 11, 1992.
Abstract of JP-521065, Norio et al., "Lithium Secondary Battery", Jan. 29, 1993.
Abstract of JP-6363193463, Yuichi et al., "Nonaqueous Solvent Secondary Battery", Oct. 8, 1988.

Primary Examiner—Prince Willis, Jr.
Assistant Examiner—M. Nuzzolillo
Attorney, Agent, or Firm—Wenderoth, Lind & Ponack

[57] ABSTRACT

A carbonaceous electrode having improved capacities of doping and dedoping a cell active substance, such as lithium, and suitable for a non-aqueous solvent-type secondary battery, is constituted by a carbonaceous material having a specific microtexture. The carbonaceous material is characterized by having an average (002)-plane spacing of at least 0.365 nm according to an X-ray diffraction test, and by providing a residual carbonaceous substance showing an average (002) plane-spacing of at most 0.350 nm according to an X-ray diffraction test when the carbonaceous material is treated with an $H_2O$—$N_2$ equi-molar gaseous mixture at 900° C. up to a weight reduction of 60%.

9 Claims, 3 Drawing Sheets

CARBONACEOUS ELECTRODE MATERIAL FOR SECONDARY BATTERY

FIELD OF THE INVENTION AND RELATED ART

The present invention relates to a carbonaceous electrode material for a secondary battery and more particularly to a carbonaceous material suitable as an electrode material for a high-energy density non-aqueous solvent-type secondary battery because of a high effective utilization rate represented by a large capacity for doping-dedoping (elimination) of a cell active substance and an excellent charge-discharge cycle characteristic. The present invention also relates to an electrode structure comprising such a carbonaceous electrode material, and a non-aqueous solvent-type secondary battery having such an electrode structure.

There has been proposed a non-aqueous solvent-type lithium (Li) secondary battery having a negative electrode comprising a carbonaceous material as a secondary battery of a high energy density (e.g., in Japanese Laid-Open Patent Application (JP-A) 57-208079, JP-A 62-90863, JP-A 62-122066 and JP-A 2-66856). This is based on utilization of a phenomenon that a carbon intercalation compound of lithium can be easily formed electrochemically. The battery comprises a negative electrode of such a carbonaceous material and a positive electrode of a lithium chalcogenide, such as $LiCoO_2$. When the battery (cell) is charged, lithium ions are released from the positive electrode, flow to the negative electrode and dope (i.e., are intercalated between layers of) the carbon of the negative electrode. The carbon thus doped with lithium functions as a lithium electrode. During the discharge, the lithium ions are de-doped (released) from the carbon negative electrode and return to the positive electrode.

In such a carbonaceous material as a negative electrode material or also a carbonaceous material as a positive electrode material which is doped with a lithium source, an amount of electricity stored per unit weight of the carbonaceous material is determined by the de-doped amount of lithium so that it is desired for a carbonaceous material constituting an electrode material to have a large lithium-dedoping capacity.

A conventional carbonaceous material obtained by calcining phenolic resin or furan resin has been known to have a large lithium-doping capacity and be desirable in this respect. However, in the case where such a carbonaceous material obtained by calcining a phenolic resin or furan resin is used in the construction of negative electrode, the lithium in the negative electrode carbon is not completely de-doped from the carbon, but rather a large amount of lithium can remain in the negative electrode carbon, so that lithiumas the active substance is apt to be wasted.

On the other hand, in case where a carbonaceous material having a developed graphite structure or pure graphite as another known carbonaceous material is used to constitute an electrode, a graphite intercalation compound is formed by doping such a carbonaceous material constituting the electrode with lithium. In such a case, if the carbonaceous material has a larger crystallite size in the c-axis direction, a larger strain is caused in the crystallites during doping-dedoping cycles, so that the larger crystallites are liable to be broken. As a result, a secondary battery constituted by using such a carbonaceous material of graphite or graphite-like carbon shows an inferior charge-discharge cycling characteristic. Further, a battery using such a graphite-rich carbonaceous material in contact with an electrolytic solution also involves a problem that the electrolytic solution is liable to be decomposed in operation of the battery.

SUMMARY OF THE INVENTION

An object of the present invention is to provide a carbonaceous electrode material for a secondary battery, which has a large charge-discharge capacity and a high active substance utilization efficiency and, thus being capable of providing a non-aqueous solvent-type secondary battery with an excellent charge-discharge cycle characteristic.

A more specific object of the present invention is to provide a carbonaceous material which has a large capacity for doping-dedoping of an active substance such as lithium, leaves little active substance without being dedoped, causes no electrolytic decomposition problem and hardly causes breakage of the crystallites thereof during-dedoping cycles.

Another object of the present invention is to provide an electrode structure by using such a carbonaceous material as described above, and also a non-aqueous solvent-type secondary battery including such an electrode structure.

According to our study, it has been found possible to provide a carbonaceous material capable of providing a non-aqueous solvent-type secondary battery having a large charge-discharge capacity, a high active substance utilization efficiency and an excellent charge-discharge cycle characteristic by properly controlling the microscopic structure of the carbonaceous material.

More specifically, according to the present invention, there is provided a carbonaceous electrode material for a non-aqueous solvent-type secondary battery, comprising a carbonaceous material having an average (002)-plane spacing (interlayer spacing) of at least 0.365 nm according to an X-ray diffraction test and characterized by providing a residual carbonaceous substance when said carbonaceous material is treated with an $H_2O$—$N_2$ equi-molar gaseous mixture at 900° C. up to a weight reduction of 60%, said residual carbonaceous substance showing an average (002) plane-spacing (interlayer spacing) of at most 0.350 nm according to an X-ray diffraction test.

The reason why the carbonaceous material according to the present invention shows excellent characteristics as an electrode material for a secondary battery, i.e., a large doping-dedoping capacity and a small "non-dedoping capacity" defined as a difference between the doping capacity and the dedoping capacity with respect to an active substance, such as lithium, has not been fully clarified as yet. It is however assumed that the performance is attributable to the fact that the carbonaceous material contains a non-graphitizable component, i.e., a low crystallinity component, contributing to an increase in doping capacity and an easily graphitizable, component, i.e., a high crystallinity component, contributing to an increase in dedoping capacity. The carbonaceous material of the present invention is considered to have appropriate proportions of non-graphitizable component and graphitizable component for achieving a high battery performance.

According to another aspect of the present invention, there is provided an electrode structure for a non-aqueous solvent-type secondary battery, comprising: an electroconductive substrate and a composite electrode layer disposed on at least one surface of the electroconductive substance; the composite electrode layer comprising a carbonaceous electrode material as described above in a particulate form, and a binder.

According to a further aspect of the present invention, there is provided a non-aqueous solvent-type secondary battery, comprising a positive electrode, a negative electrode, and a separator and a non-aqueous electrolytic solution disposed between the positive and negative electrodes; at least one of the positive and negative electrodes comprising an electrode structure as described above.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
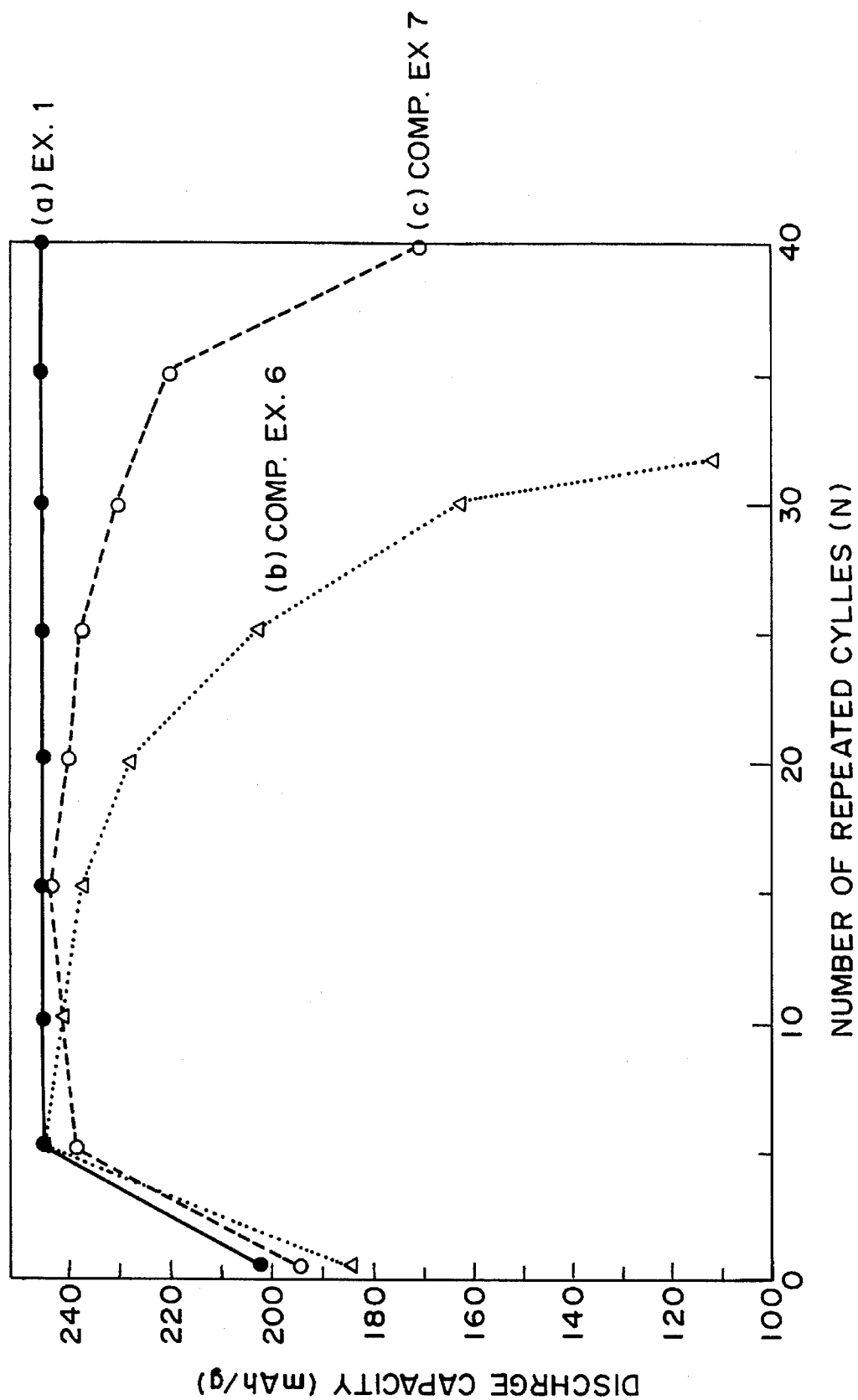
FIG. 1 is a graph showing a change with time in discharge capacity of secondary batteries having negative electrodes of carbonaceous materials according to Example 1 of the present invention and Comparative Examples as a result of a charge-discharge cycling test.

A first characteristic to be satisfied by the carbonaceous material according to the present invention is that it has an average (002) plane-spacing, i.e., an average spacing between (002) planes as measured according to X-ray diffraction analysis (hereinafter denoted by "$d_{002}$"), of at least 0.365 nm. If a negative electrode for a non-aqueous solvent-type secondary battery is constituted by a carbonaceous material having $d_{002}$ below 0.365 nm, the electrode can have only a small doping capacity for a cell active substance and is also liable to cause decomposition of the electrolyte. The spacing $d_{002}$ may preferably be 0.370–0.395 nm, further preferably 0.375–0.390 nm.

Another characteristic of the carbonaceous material according to the present invention is that it provides a residual carbonaceous substance showing $d_{002}$ of at most 0.350 nm when reacted with an $H_2O$–$N_2$ equi-molar gas mixture stream at 900° C. up to a weight reduction of 60%.

Partial gasification of a carbonaceous material by reaction with the $H_2O$—$N_2$ gas mixture at 900° C. is hereinafter referred to as "burning-off". By burning-off, such a carbonaceous material reacts with $H_2O$ to form $CO$, $CO_2$, $CH_4$, $H_2$, etc., thereby reducing its weight. The residual carbonaceous substance after the burning-off reduces the value of $d_{002}$ along with the increase in weight loss due to the burning-off ("burning loss"). Accordingly, a lower crystallinity portion of a carbonaceous material is believed to be more susceptible to burning-off. The relationship between the burning loss and $d_{002}$ varies depending on the species of carbonaceous material and the relationship can be a parameter specifying the carbonaceous material. The residual carbonaceous substance having caused a burning loss of 60 wt. % is referred to as a 60%-burnt-off carbon.

The carbonaceous material of the present invention is characterized by providing a 60%-burnt-off carbon showing $d_{002}$ of at most 0.350 nm. This means that the carbonaceous material of the present invention contains at least a carbon component (high-crystallinity component, i.e., easily graphitizable component) which results in a carbonaceous residue showing $d_{002}$ of at most 0.350 nm through the process of 60% burning-off. As a result, the carbonaceous material of the present invention is believed to be a carbonaceous material of a structure which contains a carbon component having $d_{002}$ of at most 0.350 nm and shows $d_{002}$ of at least 0.365 nm as a whole. The large doping-dedoping capacity for active substance and ability of leaving little active substance remaining therein without dedoping of the carbonaceous material according to the present invention may presumably be attributable to such a microscopic structure of the carbonaceous material as described above.

The carbonaceous material of the present invention may preferably satisfy the following characteristics in addition to the above-mentioned essential requirements.

As first such a feature, the carbonaceous material may preferably show an exothermic peak temperature Tp during differential thermal analysis in an air atmosphere (hereinafter sometimes simply referred to as "differential exothermic peak temperature" or "Tp") and a true density $\sigma$ (g/cm$^3$) (hereinafter sometimes denoted by "$\sigma$") satisfying the following formulae (1) and (2):

$$1.70 \geq \sigma \geq 1.45, \qquad \text{Formula (1)}$$

$$280 \geq Tp - 250\sigma \geq 230. \qquad \text{Formula (2)}$$

The true density of a carbonaceous material largely depends on the degree of crystallization and minute pore structure of carbon. The true density of a carbonaceous material increases along with an increase in crystallinity and approaches 2.27 g/cm$^3$ of graphite. The carbonaceous material of the present invention may preferably be one which has a relatively low degree of crystallization, as represented by a true density in the range denoted by the above formula (1).

On the other hand, the differential exothermic peak temperature of a carbonaceous material depends on the crystalline structure, pore structure and physical and chemical properties of the pore surfaces of the carbonaceous material. The temperature Tp of a carbonaceous material increases along with an increase in $\sigma$ but the manner of the change can vary depending on the carbonaceous material concerned. The Tp and $\sigma$ of the carbonaceous material may preferably satisfy a relationship of the above formula (2), preferably of the following formula (2a):

$$270 \geq Tp - 250\sigma \geq 230. \qquad \text{Formula (2a)}$$

The carbonaceous material of the present invention may preferably show a scattering intensity $I_{S(0)}$ of at most 15, wherein $I_{S(0)}$ denotes a scattering intensity normalized at an origin of Guinier plots of small-angle X-ray scattering data of the carbonaceous material. By using a carbonaceous material showing such a characteristic to prepare a secondary battery, it is possible to obtain a secondary battery having a further large doping-dedoping capacity. $I_{S(0)}$ may preferably be at most 10.

In the case where a carbonaceous material contains pores therein, $I_{S(0)}$ of the carbonaceous material may be given by the following formula:

$$I_{S(0)} = C \cdot N \cdot Ie \cdot v^2 \cdot (\rho a - \rho c)^2,$$

wherein V denotes an average void volume per pore, N denotes a number of voids per unit weight, Ie denotes Thomson scattering intensity of one electron, $\rho a$ and $\rho c$ denote the densities of air and carbon, respectively, and C is a proportional constant. In the case of carbonaceous materials wherein Ie and $\rho c$ may be regarded as constant for all the materials, and as $\rho a$ is constant, the above formula for $I_{S(0)}$ may be summarized by the following formula:

$$I_{S(0)} = C' \cdot N \cdot V^2,$$

wherein C' is a proportional constant.

Accordingly, $I_{S(0)}$ is a parameter specifying the microtexture of a carbonaceous material.

The carbonaceous material according to the present invention may preferably have a true density of 1.45–1.70 g/cm$^3$ and a scattering intensity $I_{S(0)}$ of at most 15.

When the carbonaceous material of the present invention is observed through a polarizing microscope, there are observed two minute regions which are optically isotropic but having different reflectivities (brightness).

Figure 2:
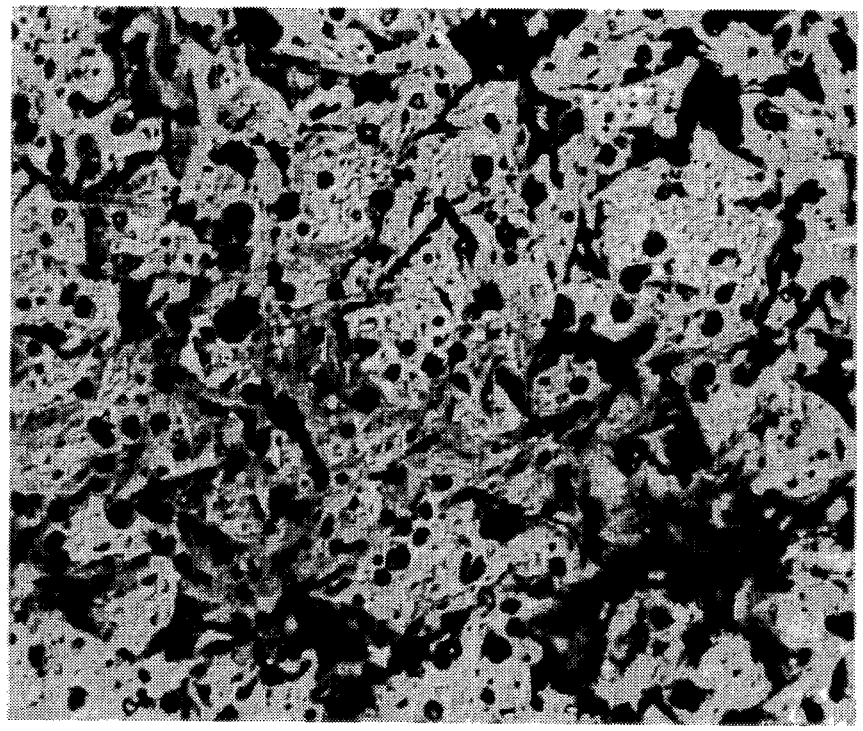
FIGS. 2, 3 and 4 are polarizing microscopic photographs at a magnification of 1300 of carbonaceous materials obtained in Example 1, Comparative Example 1 and Comparative Example 6, respectively, appearing hereinafter.

The observation of a carbonaceous material through a polarizing microscope is generally used for observation of an optically anisotropic texture. The carbonaceous material according to the present invention is optically isotropic as a whole sample, but the reflectivities therein are not uniform and two regions of different reflectivities are observed as regions having different brightness as shown in FIG. 2 (a polarizing microscopic photograph of a carbonaceous material obtained in Example 1 described hereinafter). The photographic image of FIG. 2 includes apparently darkest regions (called "region(s) A"), apparently brightest regions (called "region(s) B") and intermediate brightness regions (called "region(s) C"). The regions A are regions of void, where no carbonaceous material is present, and the carbonaceous material according to the present invention is composed of the regions B and C. These two types of regions (regions B and C) are observed to form a mutually networked or sea-island texture.

The carbonaceous material according to the present invention is characterized in that it is optically isotropic as a whole but comprises two kinds of minute carbonaceous structure elements (regions B and C) showing different reflectivities.

Figure 3:
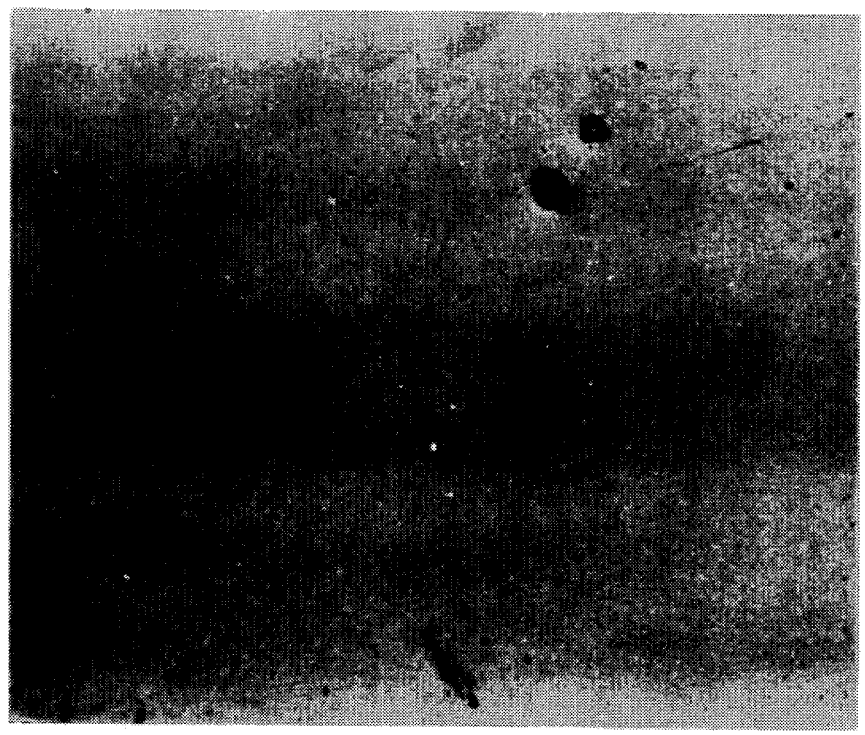

In contrast thereto, a conventional carbonaceous material obtained by calcining and carbonizing, e.g., phenolic resin, is optically isotropic and uniform as a whole, i.e., showing no regions of different reflectivities, as shown in FIG. 3 (a polarizing microscopic photograph of a carbonaceous material obtained in Comparative Example 1 described hereinafter). In FIG. 3, two circular black spots represent voids. So-called "hard carbon" obtained by calcining and carbonizing a thermosetting resin, such as phenolic resin or furan resin, generally shows such a texture.

Figure 4:

On the other hand, so-called "soft carbon" obtained by calcining and carbonizing pitch or tar of petroleum- or coal-origin shows a microscopic texture which is optically anisotropic and includes a so-called flow-texture as shown in FIG. 4 (a microscopic photograph obtained in Comparative Example 4 appearing hereinafter). In FIG. 4, the apparently darkest continuous phase represents a portion of epoxy resin used for embedding a sample of the carbonaceous material. The optically anisotropic regions are clearly discriminatable by different colors when directly observed through a polarizing microscope.

It is known that a carbonaceous material accompanied with internal strain, even if it is optically isotropic, shows a difference in reflectivity when observed through a polarizing microscope. It is considered that such an internal strain in a carbonaceous material can be caused by an external pressure, etc., and also by a local difference in thermal shrinkage at the time of calcining and carbonizing a carbon precursor.

As has been described above, the carbonaceous material according to the present invention is a carbonaceous material having a structure including a mixture of high-crystallinity portions and low-crystallinity portions. In the carbonaceous material according to the present invention, it is presumed that the internal strain has been caused by a difference in thermal shrinkage at the time of formation of the high-crystallinity portions and low-crystallinity portions during the step of calcining and carbonizing the carbon precursor.

It is believed that such a structure is reflected in the above-mentioned characteristic features as a result of observation through a polarizing microscope of the carbonaceous material according to the present invention.

Parameters characterizing the carbonaceous material according to the present invention inclusive of $d_{002}$, $L_{C(002)}$ (i.e., the size of a crystallite in the c-axis direction; sometimes also simply referred to a "$L_C$"), an exothermic peak temperature according to (DTA) (differential thermal analysis) and $d_{002}$ of a 60% burnt-off carbon, and the results of polarizing microscopic observation, described herein, are based on the following methods:

[$d_{002}$ and $L_{C(002)}$ of carbonaceous material]

A powdery sample of a carbonaceous material is packed in a sample holder and is irradiated with monochromatic CuKα rays through a graphite monochromator to obtain an X-ray diffraction pattern. The peak position of the diffraction pattern is determined by the center of gravity method (i.e., a method wherein the position of a gravity center of diffraction lines is obtained to determine a peak position as a 2θ value corresponding to the gravity center) and calibrated by the diffraction peak of the (111) plane of high-purity silicon powder as the standard substance. The wavelength of the CuKα rays is set to 0.15418 nm, and $d_{002}$ is calculated from the Bragg's equation.

$L_{C(002)}$ is calculated by the Scherrer's equation based on a value $\beta_{1/2}$ which is a difference obtained by subtracting a half-width value of the (111) diffraction peak of high-purity silicon powder as the standard substance from the half-value width of the (002) diffraction peak of a sample carbonaceous material. Herein, the shape factor k is set to 0.9.

$$d_{002} = \lambda/(2 \cdot \sin\theta) \qquad \text{(Bragg's equation)}$$

$$L_{C(002)} = (k \cdot \lambda)/(\beta_{1/2} \cdot \cos\theta) \qquad \text{(Scherrer's equation)}$$

[Exothermic peak temperature by DTA]

A powdery carbonaceous material sample which has been sieved to below 250 mesh after optional pulverization, is weighed in 2.0 mg and placed in a differential thermal analyzer. Dry air (dew point: ≦−50° C.) is flowed at a rate of 100 ml/min., and the sample is held at 200° C. for 1 hour and then subjected to temperature raising at a rate of 10° C./min to obtain an exothermic curve corresponding to oxidation of the carbonaceous material. A temperature giving a maximum quantity of heat evolution is referred to as an exothermic peak temperature.

[True density]

The true density of a carbonaceous material sample is measured by the butanol method according to a method prescribed in JIS R7212.

[$I_{S(0)}$]

X-ray small-angle scattering measurement is performed by using an apparatus available from K. K. Rigaku under the following conditions.

X-ray generator: High luminance Rotaflex RU-200BH

X-ray source: Point focus, CuKα (through Ni filter)

X-ray power: 50 kV–20 mA

Goniometer: Model 2303E1

Slit diameter: (1st) 0.2–(2nd) 0.2 mm

X-ray vacuum path device: Accessory for the goniometer (Model 2303E1)

Detector: Model PSPC-5 (effective length: 100 mm, PR gas (argon+10% methane) flow)

Window height regulation slit width: 4 mm

Camera length: 271 mm

Measurement time: 1000 sec

In operation of the above apparatus, the X-ray vacuum path device between the sample holder and the detector is evacuated to establish a vacuum. X-ray scattering intensity measurement is performed twice, i.e., to measure a scattering intensity $I_{m(s)}$ when the sample holder is filled with a powdery carbonaceous material sample (while applying a 6 μm-thick polyethylene terephthalate film on both sides of the sample holder so as to prevent the falling of the powdery sample) and to measure a scattering intensity B(s) when the sample holder is not filled with any sample. In this case, the coherent scattering intensity $I_{G(S)}$ of the sample per unit weight is given by the following equation:

$$I_{G(S)} = (I_{m(S)} - A \cdot B(s))/(A \cdot \ln A),$$

wherein s is a parameter given as a function of a scattering angle 2θ and a wavelength λ according to the equation: $s = 2 \sin \theta/\lambda$, and A is an absorption factor of the powdery carbonaceous material sample determined by using an X-ray wide-angle scattering apparatus in the following manner.

Thus, (111) diffraction rays from standard high-purity silicon powder are made monochromatic by passing through an Ni filter. The diffraction rays are caused to pass through a sample holder containing a carbonaceous material sample to measure an intensity $I_S$ and also caused to pass through the sample holder containing no sample to measure an intensity $I_O$. From these values, the absorption factor A is determined from the equation: $A = I_S/I_O$.

The above-obtained measurement values are used to provide a Guinier plot on a coordinate system having an ordinate for ln ($I_{G(S)}$) and an abscissa for $s^2$, thereby obtaining a straight regression line in the range of $s^2$ being 0.0004 to 0.0011. Then, the straight line is extrapolated to $s^2=0$, at which the scattering intensity is determined as a scattering intensity $I_{G(0)}$ at the origin.

The scattering intensity $I_{G(0)}$ thus obtained can vary depending on the intensity of incident X-rays, etc., so that the scattering intensity of a carbonaceous material sample is normalized by using a scattering intensity due to air in the X-ray path between the sample holder and the detector. More specifically, in the above-mentioned small-angle scattering meter, the sample holder is filled with no sample, and the X-ray vacuum path device between the sample holder and the detector is filled with air at 1 atm, thereby measuring a scattering intensity $I_{A(s)}$ of the air in the X-ray vacuum path device. The $I_{A(s)}$ values are treated in the same manner as in the above-described case for the carbonaceous material samples by providing a Guinier plot to obtain a scattering intensity $I_{A(0)}$ at the origin, from which a normalized scattering intensity $I_{S(0)}$ of the carbonaceous material sample is obtained according to the following equation:

$$I_{S(0)} = I_{G(0)}/I_{A(0)}.$$

[Polarizing microscopic observation]

A sample for the observation is prepared by (i) in case of a powdery carbonaceous material, adding about 10 wt. % of the carbonaceous material into liquid epoxy resin and, after sufficient mixing, charging the resultant mixture in a mold frame (in a diameter of 25 mm) of silicone rubber or (ii) in case of particle-shaped or block-shaped carbonaceous material, optionally formulating the carbonaceous material into particles of several millimeters in diameter and embedding several particles within liquid epoxy resin charged in the above-mentioned mold frame, respectively followed by curing the epoxy resin at 120 °C. for 24 hours. The resultant cured epoxy resin is cut at an appropriate part thereof so as to expose the embedded carbonaceous material at the surface, followed by buffing for mirror finishing. The thus-prepares sample is observed through a polarizing microscope (available from Olympus K. K.) equipped with an objective lens at a magnification of about 100 and an ocular lens at a magnification of about 10 so as to provide an overall magnification of about 1000 and also photographed through the microscope. The observation may suitably be performed while adjusting the aperture iris and the flare iris at their utmost restricting states because the brightness contrast of regions of a carbonaceous material is generally low.

[$d_{002}$ of 60%-burnt-off carbon]

A sample carbonaceous material in the form of particles of at most 1 mm in diameter is heated to 900 °C. in an $N_2$ gas stream. When the temperature reaches 900° C., the $N_2$ gas stream is switched to a burn-off gas stream of $N_2$ 50 mol. % and $H_2O$ 50 mol % to effect burning-off for a predetermined period. Then, the burn-off gas is switched to $N_2$ and the system is cooled to obtain a burnt-off carbon. The reduction in weight loss expressed in percentage of a carbonaceous material due to burning-off is referred to as a burning loss. The above operation is repeated while changing the predetermined period for burning-off to obtain several burnt-off carbon samples characterized by different levels of burning losses, and the $d_{002}$ values of the burnt-off carbon samples are measured according to the above-described method for measuring $d_{002}$ of a carbonaceous material. Based on the measured values, the relation between the burning loss and $d_{002}$ is approximated by a smooth curve, from which $d_{002}$ value corresponding to a burning loss of 60% is obtained.

The carbonaceous material according to the present invention may for example be produced through a process as described below.

A pitch, such as petroleum pitch or coal pitch, is mixed under heating with an additive comprising an aromatic compound having a boiling point of at least 200° C. and having generally two to three rings or a mixture of such aromatic compounds to form a shaped pitch product. Then, the additive is removed from the pitch product by extraction with a solvent having a low dissolving power for the pitch and a high dissolving power for the additive to form a porous pitch, which is then oxidized to form a porous pitch infusibilized by heating. The infusible porous pitch is calcined in an inert gas atmosphere to obtain a carbonaceous material according to the present invention.

The above-mentioned aromatic additive is added for the purpose of converting the shaped pitch product into a porous material through removal by extraction of the additive so as to facilitate the micro-structure control by oxidation and calcination of the carbonaceous material in the subsequent steps. Such an additive may more specifically be selected as a single species or a mixture of two or more species selected from, e.g., naphthalene, methylnaphthalene, phenylnaphthalene, benzylnaphthalene, methyl-anthracene, phenanthrene, and biphenyl. The additive may preferably be added in a proportion of 10–50 wt. parts per 100 wt. parts of the pitch.

The mixing of the pitch and the additive may suitably be performed in a molten state under heating in order to achieve uniform mixing. The resultant mixture of the pitch and additive may preferably be shaped into particles of at most 1 mm in diameter so as to facilitate the extraction of the additive from the mixture. The shaping may be performed in a molten state or by pulverization of the mixture after cooling.

Suitable examples of the solvent for removal by extraction of the additive from the mixture of the pitch and the additive may include: aliphatic hydrocarbons, such as butane, pentane, hexane and heptane; mixtures principally comprising aliphatic hydrocarbons, such as naphtha and kerosene; and aliphatic alcohols, such as methanol, ethanol, propanol and butanol.

By extracting the additive from the shaped mixture product with such a solvent, it is possible to remove the additive from the shaped product while retaining the shape of the product. At this time, it is assumed that holes are formed at parts from which the additive is removed, thereby providing a uniformly porous pitch product.

The thus-obtained porous pitch product is then subjected to an infusibilization treatment, i.e., an oxidation treatment at a temperature of from room temperature to 400° C. by using an oxidizing agent, thereby to form a thermally infusible porous pitch product. Examples of the oxidizing agent may include: oxidizing gases, such as $O_2$, $O_3$, $SO_3$, $NO_2$, $Cl_2$, mixture gases formed by these gases diluted with, e.g., air or nitrogen, and air; and oxidizing liquids, such as sulfuric acid, phosphoric acid, nitric acid, chromic acid salt aqueous solution, permanganic acid salt solution, and hydrogen peroxide aqueous solution.

The porous infusible pitch product may be calcined at 900°–2000° C. in an inert atmosphere, optionally after pre-carbonization at 500°–700° C., to provide a carbonaceous material according to the present invention.

The carbonaceous material according to the present invention may be easily obtained by appropriately controlling the degree of oxidation and the temperature of the subsequent calcination. In general, at an identical degree of oxidation, $d_{002}$ tends to decrease at a higher calcination temperature and, at an identical calcination temperature, $d_{002}$ tends to increase at a higher degree of oxidation. In case of using air as an oxidizing agent, for example, it is preferred to oxidize the porous pitch product at a temperature of 150°–400° C. so as to provide the pitch product with an oxygen content of 2–30 wt. % and then effect the calcination.

In case of using the carbonaceous material according to the present invention for producing an electrode of a non-aqueous solvent-type secondary battery, the carbonaceous material may be optionally formed into fine particles having an average particle size of 5–100 μm and then mixed with a binder stable against a non-aqueous solvent, such as polyvinylidene fluoride, polytetrafluoroethylene or polyethylene, to be applied onto an electroconductive substrate, such as a circular or rectangular metal plate, to form, e.g., a 10–200 μm-thick layer. The binder may preferably be added in a proportion of 1–20 wt. % of the carbonaceous material. If the amount of the binder is excessive, the resultant electrode is liable to have too large an electric resistance and provide the battery with a large internal resistance. On the other hand, if the amount of the binder is too small, the adhesion of the carbonaceous material particles with each other and with the electroconductive substrate is liable to be insufficient. The conversion into particles can also be performed at an intermediate stage of the carbonaceous material formation, such as before carbonization of the infusibilized pitch shaped body or after the preliminary carbonization. The above described formulation and values have been set forth with respect to production of a secondary battery of a relatively small capacity, whereas, for production of a secondary battery of a larger capacity, it is also possible to form the above-mentioned mixture of the carbonaceous material fine particles and the binder into a thicker shaped product, e.g., by press-forming, and electrically connect the shaped product to the electroconductive substrate.

The carbonaceous material of the present invention can also be used as a positive electrode material for a non-aqueous solvent-type secondary battery by utilizing its good doping characteristic but may preferably be used as a negative electrode material of a non-aqueous solvent-type secondary battery, particularly for constituting a negative electrode to be doped with lithium as an active substance of a lithium secondary battery.

In the latter case, the positive electrode material may comprise a complex metal chalcogenide represented by a general formula: $LiMY_2$ (wherein M denotes at least one species of transition metals, such as Co and Ni, and Y denotes a chalcogen, such as O or S), particularly a complex metal oxide inclusive of $LiCoO_2$ as a representative. Such a positive electrode material may be formed alone or in combination with an appropriate binder into a layer on an electroconductive substrate.

The non-aqueous solvent-type electrolytic solution used in combination with the positive electrode and the negative electrode described above may generally be formed by dissolving an electrolyte in a non-aqueous solvent. The non-aqueous solvent may comprise one or two or more species of organic solvents, such as propylene carbonate, ethylene carbonate, dimethoxyethane, diethoxyethane, γ-butyrolactone, tetrahydrofuran, 2-methyltetrahydrofuran, sulfolane, and 1,3-dioxolane. Examples of the electrolyte may include $LiClO_4$, $LiPF_6$, $LiBF_4$, $LiCF_3SO_3$, $LiAsF_6$, $LiCl$, $LiBr$, $LiB(C_6H_5)_4$, and $LiCH_3SO_3$.

A secondary battery of the present invention may generally be formed by disposing the above-formed positive electrode layer and negative electrode layer opposite to each other, optionally with a liquid-permeable separator composed of, e.g., unwoven cloth or other porous materials, disposed therebetween, and dipping the positive and negative electrode layers together with an intermediate permeable separator in an electrolytic solution as described above.

Hereinbelow, the present invention will be described more specifically with reference to Examples and Comparative Examples.

EXAMPLE 1

68 kg of a petroleum pitch having a softening temperature of 210° C., a quinoline-insoluble content of 1 wt. % and an H/C atomic ratio of 0.63, and 32 kg of naphthalene, were placed in a 300 liter-pressure-resistant vessel equipped with stirring blades, melt-mixed under heating at 190° C. and, after being cooled to 80°–90° C., extruded to form an about 500 μm dia.-string-shaped product. Then, the string-shaped product was broken so as to provide a diameter-to-length ratio of about 1.5, and the broken product was charged into an aqueous solution containing 0.53 wt. % of polyvinyl alcohol (saponification degree=88%) and heated to 93° C., followed by stirring for dispersion and cooling to form a slurry of pitch spheres. After removing a major part of water by filtration, the pitch spheres were subjected to extraction with about 6 times by weight of n-hexane to remove the naphthalene in the pitch spheres. The thus-obtained porous spherical pitch was heated to 260° C. in a fluidized bed while passing heated air and held at 260° C. for 1 hour to be oxidized into a thermally-infusible porous spherical pitch product. The pitch product was then further heated at a rate of 60° C./hr to 1200° C. in a nitrogen gas atmosphere and calcined at that temperature for 1 hour, followed by cooling to obtain a carbonaceous material according to the present invention.

The thus-produced spherical carbonaceous material having an average particle size of about 400 μm showed a $d_{002}$ value of 0.378 nm, a $d_{002}$ value for a 60%-burnt-off carbon of 0.342 nm, a crystallite size in c-axis direction $L_C$ of 1.26 nm, respectively measured according to the above-described methods, and a specific surface area as measured by the BET method ($S_{BET}$) of 2.4 m²/g.

EXAMPLE 2

A porous carbonaceous material was prepared in the same manner as in Example 1 except that the porous pitch spheres were oxidized at 300° C.

The thus-produced carbonaceous material showed $d_{002}$= 0.379 nm, $d_{002}$ (for 60%-burnt-off carbon)=0.345 nm, $L_C$=1.15 nm, and $S_{BET}$=2.8 m²/g.

EXAMPLE 3

The thermally-infusible porous spherical pitch product prepared in Example 1 was heated in a nitrogen gas stream at a rate of 600° C./hr to 600° C. and held at the temperature for 1 hour, followed by cooling, to obtain a pre-calcined carbon. The pre-calcined carbon was pulverized into an average particle size of 25 μm and then further heated in a nitrogen gas stream at a rate of 600° C./hr to 1000° C. and held at the temperature for 1 hour for main calcination, followed by cooling, to prepare a carbonaceous material.

EXAMPLES 4 and 5

Carbonaceous materials were prepared in the same manner as in Example 3 except that the main calcination was effected at 1100° C. (Example 4) and 1300° C. (Example 5), respectively.

EXAMPLE 6

A carbonaceous material was prepared in the same manner as in Example 3 except that the main calcination was performed by placing the pre-calcined and pulverized carbon in a furnace, replacing the atmosphere in the furnace with a nitrogen gas stream, stopping the nitrogen gas stream and calcining the pre-calcined carbon at 1100° C. in the atmosphere of naturally evolved gas.

EXAMPLES 7 and 8

Carbonaceous materials were prepared in the same manner as in Example 3 except that the porous pitch spheres were oxidized for infusibilization respectively at 200° C. (Example 7) and 220° C. (Example 8), and the main calcination was respectively performed at 1200° C.

As a result of observation through a polarizing microscope, the carbonaceous materials prepared in the above Examples 1–8 were respectively confirmed to be optically isotropic but comprise two types of minute regions showing different reflectivities. A polarizing microscopic photograph (magnification=1300) of the carbonaceous material according to Example 1 in the state of spherical particles before pulverization is shown representatively as FIG. 2. In FIG. 2, the entire view field is occupied with the carbonaceous material.

Comparative Example 1

A phenolic resin ("Bellpearl C-800", available from Kanebo K. K.) was pre-cured at 170° C. for 3 min., and then cured at 130° C. for 8 hours. Then, the cured resin was heated in a nitrogen atmosphere at a rate of 250° C./h to 1200° C. and held at 1200° C. for 1 hour, followed by cooling to prepare a phenolic resin-calcined carbon (carbonaceous material).

The phenolic resin-calcined carbon showed $d_{002}$=0.381 nm, $d_{002}$ (for 60%-burnt-off carbon)=0.357 nm, $L_C$=1.06 nm, and $S_{BET}$=0.3 m²/g.

Comparative Example 2

A furan resin ("Hitafuran VF-303", available from Hitachi Kasei K. K.) was cured at 100° C. for 14 hours. Then, the cured resin was heated in a nitrogen atmosphere at a rate of 250° C./hr to 1200° C. and held at 1200° C. for 1 hour, followed by cooling, to prepare a furan resin-calcined carbon (carbonaceous material).

The furan resin-calcined carbon showed $d_{002}$=0.378 nm, $d_{002}$ (for 60%-burnt-off carbon)=0.357 nm, $L_C$=1.21 nm, and $S_{BET}$=6.5 m²/g.

Comparative Example 3

A carbonaceous material was prepared in the same manner as in Comparative Example 2 except that the calcination temperature was changed to 1600° C.

Comparative Example 4

Charred coconut shell was pulverized into an average particle size of 25 μm and then subjected to main calcination at 1200° C. for 1 hour in a nitrogen atmosphere to obtain calcined coconut shell carbon (carbonaceous material).

Comparative Example 5

A carbonaceous material was prepared in the same manner as in Comparative Example 4 except that the calcination temperature was changed to 1500° C.

Comparative Example 6

The petroleum pitch used in Example 1 was pre-calcined at 600° C. for 1 hour in a nitrogen atmosphere, pulverized into an average particle size of 25 μm and then subjected to main calcination at 1200° C. for 1 hour in a nitrogen atmosphere to prepare a carbonaceous material.

Comparative Example 7

A carbonaceous material was prepared by treating a vinyl chloride resin (average polymerization degree=700) instead of the petroleum pitch in the same manner as in Comparative Example 6.

As a result of observation through a polarizing microscope, the carbonaceous materials prepared in the above Comparative Examples 1–5 were all found to be optically isotropic and show no portions of different reflectivities. A polarizing microscopic photograph (magnification=1300) of the carbonaceous material according to Comparative Example 1 in the state of block carbon before pulverization is shown representatively as FIG. 3. In FIG. 3, the entire view field is occupied with the block carbon.

On the other hand, the carbonaceous materials prepared in Comparative Examples 6 and 7 were found to be optically anisotropic and the anisotropic units showed a flow texture. A polarizing microscopic photograph (magnification=1300) of the carbonaceous material (in a powdery form) according to Comparative Example 6 is shown representatively as FIG. 4. In FIG. 4, an apparently black continuous region represents a phase of the epoxy resin used for embedding the powdery carbonaceous material sample for observation through the polarizing microscope.

Various properties and parameters characterizing the carbonaceous material prepared in Examples and Comparative Examples are summarized in the following Table 1.

vinylidene fluoride were mixed together with N-methyl-2-pyrrolidone to form a paste composite, which was then applied uniformly onto a copper foil. The composite, after being dried, was peeled off the copper foil and stamped into a 21 mm dia.-disk. The disk was then press-bonded onto a 21 mm dia.-circular shaped net of stainless steel to form a positive electrode containing about 40 mg of the carbonaceous material. On the other hand, a negative electrode was prepared by stamping a 1 mm thick-sheet of lithium metal into a 21 mm-dia.-disk.

The thus-prepared positive and negative electrodes were disposed opposite to each other with a porous polypropylene film as a separator disposed therebetween, and the resultant structure was dipped in an electrolytic solution comprising a 1:1 (by volume)-mixture solvent of propylene carbonate and dimethoxyethane and $LiClO_4$ dissolved therein at a rate

TABLE 1

| | | Properties of carbonaceous materials | | | | | | | |
|---|---|---|---|---|---|---|---|---|---|
| Example | Raw material | Calc. temp. (°C.) | $d_{002}$ (nm) | $d_{002}$ for 60% burnt-off carbon (nm) | Tp (°C.) | (Tp-250σ) | σ (g/cm³) | $I_s^-$ (0) | Microscopic observation *1 |
| Ex. 1 | pitch | 1200 | 0.378 | 0.342 | 645 | 257.5 | 1.55 | 9 | A |
| 2 | pitch | 1200 | 0.379 | 0.345 | 643 | 258.0 | 1.54 | 8 | A |
| 3 | pitch | 1000 | 0.384 | 0.345 | 632 | 254.5 | 1.51 | 5 | A |
| 4 | pitch | 1100 | 0.383 | 0.345 | 639 | 259.0 | 1.52 | 5 | A |
| 5 | pitch | 1300 | 0.371 | 0.340 | 660 | 272.5 | 1.55 | 11 | A |
| 6 | pitch | 1100 | 0.380 | 0.343 | 664 | 276.5 | 1.55 | 5 | A |
| 7 | pitch | 1200 | 0.372 | 0.339 | 663 | 253.0 | 1.64 | 10 | A |
| 8 | pitch | 1200 | 0.374 | 0.340 | 645 | 245.0 | 1.60 | 7 | A |
| Comp. Ex. 1 | phenolic resin | 1200 | 0.381 | 0.357 | 649 | 276.5 | 1.49 | 15 | B |
| 2 | furan resin | 1200 | 0.378 | 0.357 | 637 | 264.5 | 1.47 | 20 | B |
| 3 | furan resin | 1600 | 0.370 | 0.360 | 673 | 298.0 | 1.50 | 30 | B |
| 4 | coconut shell | 1200 | 0.382 | 0.358 | 645 | 277.5 | 1.47 | 5 | B |
| 5 | coconut shell | 1500 | 0.379 | 0.359 | 670 | 310.0 | 1.44 | 30 | B |
| 6 | pitch | 1200 | 0.352 | | 736 | 248.5 | 1.96 | 5 | C |
| 7 | PVC | 1200 | 0.356 | | 751 | 246.0 | 2.02 | 5 | C |

*1: A: Showing portions of different reflectivities.
B: Showing no portions of a different reflectivity.
C: Showing a flow texture.

[Doping/de-doping capacity for active substance]

The carbonaceous materials obtained in Examples and Comparative Examples were respectively used to prepare a non-aqueous solvent-type secondary battery (cell) and the performances thereof were evaluated in the following manner.

The carbonaceous material is generally suited for constituting a negative electrode of a non-aqueous solvent secondary battery. However, in order to accurate evaluate the performances of a carbonaceous material inclusive of a doping capacity (A) and a dedoping capacity (B) for a cell active substance and also an amount of the cell active substance remaining in the carbonaceous material without being dedoped (hereinafter called a "non-dedoping capacity" (A–B)) without being affected by a fluctuation in performance of a counter electrode material, a lithium metal electrode showing a stable performance was used as a negative electrode, and each carbonaceous material prepared above was used to constitute a positive electrode, thereby forming a lithium secondary battery, of which the performances were evaluated.

The positive electrode was prepared as follows. Each carbonaceous material prepared above was used as it was if it was in a powdery form or after being pulverized into an average particle size of about 20 μm if it was in a larger particle or block form. Then, 90 wt. parts of the carbonaceous material thus formulated and 10 wt. parts of polyof 1 mol/liter, thereby forming a non-aqueous solvent-type lithium secondary battery.

In the lithium secondary battery thus constituted, the carbonaceous material in the positive electrode was doped with lithium at a constant current of about 40 mA/g (carbon). More specifically, the doping was effected by repeating a cycle including 1 hour of current conduction and 2 hours of pause until the equilibrium potential between the positive and negative electrodes reached 0 volt. The electricity thus flowed was divided by the weight of the carbonaceous material to provide a doping capacity (A) in terms of mAh/g. Then, in a similar manner, a current was flowed in a reverse direction to dedope the lithium from the doped carbonaceous material until the positive electrode of the carbonaceous material reached +1.5 volts with reference to the lithium negative electrode. The electricity thus flowed was divided by the weight of the carbonaceous material to provide a dedoping capacity (B) in terms of mAh/g. Then, a non-dedoping capacity (A–B) was calculated as a difference between the doping capacity (A) and the dedoping capacity (B), and a discharge efficiency (%) was obtained by dividing the dedoping capacity (B) with the doping capacity (A) and multiplying the quotient (B/A) with 100. The discharge efficiency is a measure of effective utilization of the active substance.

The performances of the lithium secondary batteries using positive electrodes of the respective carbonaceous materials measured in the above-described manner are summarized in the following Table 2.

TABLE 2

| | | Cell properties | | | |
|---|---|---|---|---|---|
| | Raw material | Doping capacity (A) mAh/g | Dedoping capacity (B) mAh/g | Non-dedoping capacity (A − B) mAh/g | Discharge efficiency (B/A × 100) (%) |
| Ex. 1 | Pitch | 467 | 396 | 71 | 85 |
| 2 | Pitch | 481 | 397 | 84 | 83 |
| 3 | Pitch | 639 | 455 | 184 | 71 |
| 4 | Pitch | 563 | 431 | 132 | 77 |
| 5 | Pitch | 410 | 340 | 70 | 83 |
| 6 | Pitch | 380 | 273 | 107 | 75 |
| 7 | Pitch | 449 | 358 | 91 | 80 |
| 8 | Pitch | 495 | 396 | 89 | 80 |
| Comp. Ex. 1 | Phenolic resin | 534 | 291 | 243 | 54 |
| 2 | Furan resin | 681 | 428 | 253 | 62 |
| 3 | Furan resin | 243 | 175 | 68 | 72 |
| 4 | Coconut shell | 539 | 367 | 204 | 68 |
| 5 | Coconut shell | 197 | 145 | 52 | 74 |
| 6 | Pitch | 336 | 278 | 58 | 83 |
| 7 | PVC | 332 | 270 | 62 | 81 |

In view of Table 2, it is understood the positive electrode produced from the carbonaceous materials according to the invention (Examples 1–8) showed larger values in both doping capacity (A) and dedoping capacity (B) and also a remarkably small non-dedoping capacity (A–B) which is a difference between the above capacities, so that they could effectively utilize the cell active substance.

[Cell charge-discharge cycling test-1]

The performances of a carbonaceous material as a negative electrode material were evaluated in the following manner.

(Preparation of a positive electrode material)

90 wt. parts of $LiCoO_2$, 6 wt. parts of graphite powder and 3 wt. parts of polyvinylidene fluoride were sufficiently mixed together with N-methyl-2-pyrrolidone to form a paste mixture, followed by drying. The thus-dried mixture was shaped in a mold into a positive electrode in the form of a 21 mm dia.-disk. The positive electrode contained about 1 g of $LiCoO_2$.

(Preparation of a negative electrode)

A negative electrode was prepared by using a carbonaceous material prepared in Example 1 otherwise in the same manner as in the above-described preparation of a positive electrode from a carbonaceous material for measurement of the doping capacities. The negative electrode contained about 40 mg of the carbonaceous material.

The above-prepared positive electrode of $LiCoO_2$ and negative electrode of carbonaceous material were disposed opposite to each other with a porous polypropylene film as a separator disposed therebetween, and the resultant structure was dipped in an electrolytic solution comprising a 1:1 (by volume)-mixture solvent of propylene carbonate and dimethoxyethane and $LiClO_4$ dissolved therein at a rate of 1 mol/liter, thereby forming a non-aqueous solvent-type lithium secondary battery.

The thus-prepared secondary battery (cell) was subjected to a charge-discharge cycling test including a cycle of a charge capacity of 380 mAh/g-carbon, a discharge-termination voltage of 1.5 volts and a charge-discharge current density of 0.43 $mA/cm^2$, thereby to measure a discharge-efficiency (=(discharge capacity/charge capacity)×100).

As a result, the discharge efficiency was about 80% during a first cycle but was increased to 95% or higher in second to fourth cycles and to 99% or higher in fifth and subsequent cycles.

[Cell charge-discharge cycling test-2]

Secondary batteries were prepared by using some carbonaceous materials obtained in Example and Comparative Example as negative electrode materials and subjected to a charge-discharge cycling test in the following manner.

The carbonaceous materials obtained in Example 1 and Comparative Examples 1 and 2 were used for comparison.

(Preparation of a positive electrode)

A positive electrode was prepared in the same manner as in Cell charge-discharge cycling test-1 described above except that the amount of $LiCoO_2$ in the positive electrode was reduced to about 0.2 g.

(Preparation of a negative electrode)

A negative electrode was prepared in the same manner as in Cell charge-discharge cycling test-1. The negative electrode contained about 40 mg of the carbonaceous material.

The above-prepared positive electrode of $LiCoO_2$ and negative electrode of carbonaceous material were used to constitute a non-aqueous solvent-type lithium secondary battery similar to the one prepared in Cell charge-discharge cycling test-1.

The above-prepared secondary batteries were respectively subjected to a continuous charge-discharge test including a cycle of a charge capacity of 250 mAh/g-carbon, a charge termination voltage of 4.3 volts, a discharge termination voltage of 2.5 volts and a charge-discharge current density of 0.86 $mA/cm^2$. The change in discharge capacity on repetition of cycles is inclusively shown in FIG. 1 wherein the curves (a), (b) and (c) represent the charge-discharge characteristic curves of secondary batteries having negative electrodes comprising carbonaceous materials of Example 1, Comparative Example 6 and Comparative Example 7, respectively.

As is shown in FIG. 1, the secondary battery having a negative electrode prepared by using a carbonaceous material satisfying specific structural parameters according to the present invention (curve (a)) showed a remarkably excellent charge-discharge cycle characteristic compared with the secondary batteries having a negative electrode comprising a pitch-based carbon (Comparative Example 6) and a polyvinyl chloride-based carbon (Comparative Example 7) which had been known heretofore.

As described above according to the present invention, it is possible to provide a carbonaceous material suitable for constituting an electrode of a non-aqueous solvent-type secondary battery having large capacities of doping and dedoping a cell active substance by controlling the microtexture of the carbonaceous material. If the carbonaceous material is used to constitute a negative electrode of, e.g., a lithium secondary battery, it is possible to provide a secondary battery of a high energy density having a high lithium utilization efficiency and an excellent charge-discharge cycle characteristic.

What is claimed is:

1. A carbonaceous electrode material for a non-aqueous solvent-type secondary battery, comprising a pitch carbonaceous material having an average (002)-plane spacing of at least 0.365 nm according to an X-ray diffraction test, wherein said carbonaceous material is characterized by providing a residual carbonaceous substance showing an average (002) planer-spacing of at most 0.350 nm according to an X-ray diffraction test after said carbonaceous material is tested by treatment with an $H_2O$—$N_2$ equi-molar gaseous mixture at 900° C. up to a weight reduction of 60%.

2. A carbonaceous electrode material according to claim 1, further showing an exothermic peak temperature $Tp$ (°C.) during differential thermal analysis in an air atmosphere and a true density $\sigma$ (g/cm$^3$) satisfying the following formulae (1) and (2):

$$1.70 \geq \sigma \geq 1.45, \quad \text{Formula (1)}$$

$$280 \geq Tp - 250\sigma \geq 230. \quad \text{Formula (2)}$$

3. A carbonaceous electrode material according to claim 1, further showing a scattering intensity $I_{S(0)}$ of at most 15, wherein $I_{S(0)}$ denotes a scattering intensity normalized at an origin of Guinier plots of small-angle X-ray scattering data of the carbonaceous material.

4. A carbonaceous electrode material for a non-aqueous solvent-type secondary battery, comprising a pitch carbonaceous material having an average (002)-plane spacing of at least 0.365 nm according to an X-ray diffraction test and characterized by being optically isotropic and showing two types of regions having different reflectivities respectively when observed through a polarizing microscope.

5. A carbonaceous electrode material according to claim 4, further showing an exothermic peak temperature $Tp$ (°C.) during differential thermal analysis in an air atmosphere and a true density $\sigma$ (g/cm$^3$) satisfying the following formulae (1) and (2):

$$1.70 \geq \sigma \geq 1.45, \quad \text{Formula (1)}$$

$$280 \geq Tp - 250\sigma \geq 230. \quad \text{Formula (2)}$$

6. A carbonaceous electrode material according to claim 4, further showing a scattering intensity $I_{S(0)}$ of at most 15, wherein $I_{S(0)}$ denotes a scattering intensity normalized at an origin of Guinier plots of small-angle X-ray scattering data of the carbonaceous material.

7. An electrode structure for a non-aqueous solvent-type secondary battery, comprising: an electroconductive substrate and a composite electrode layer disposed on at least one surface of the electroconductive substance;

said composite electrode layer comprising a carbonaceous electrode material according to any one of claims 1–6 in a particulate form, and a binder.

8. A non-aqueous solvent-type secondary battery, comprising, a positive electrode, a negative electrode, and a separator and a non-aqueous electrolytic solution disposed between the positive and negative electrodes;

at least one of said positive and negative electrodes comprising an electrode structure according to claim 7.

9. A secondary battery according to claim 8, wherein the electrode structure comprises the negative electrode.

* * * * *